United States Patent
Kishiyama et al.

(10) Patent No.: US 8,442,220 B2
(45) Date of Patent: May 14, 2013

(54) TRANSMISSION APPARATUS AND TRANSMISSION METHOD

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 991 days.

(21) Appl. No.: 12/278,720

(22) PCT Filed: Feb. 7, 2007

(86) PCT No.: PCT/JP2007/052142
§ 371 (c)(1),
(2), (4) Date: Dec. 19, 2008

(87) PCT Pub. No.: WO2007/091607
PCT Pub. Date: Aug. 16, 2007

(65) Prior Publication Data
US 2009/0296925 A1 Dec. 3, 2009

(30) Foreign Application Priority Data
Feb. 8, 2006 (JP) .................................. 2006-031746

(51) Int. Cl.
*H04K 1/10* (2006.01)
(52) U.S. Cl.
USPC ................. 380/33; 380/34; 380/36; 370/343; 370/345
(58) Field of Classification Search ......................... None
See application file for complete search history.

(56) References Cited

FOREIGN PATENT DOCUMENTS

| JP | 2003-179522 A | 6/2003 |
|---|---|---|
| JP | 2003-319005 A | 11/2003 |
| JP | 2005-318309 A | 11/2005 |
| JP | 2006-033480 A | 2/2006 |

OTHER PUBLICATIONS

"MBMS Structure for Evolved UTRA", Toshiba Corporation, Jan. 2006, pp. 1-6.*
"Pilot Channel and Scrambling Code in Evolved UTRA Downlink" NTT DoCoMo, Jun. 2005, pp. 1-24.*
"Multiplexing of Broadcast and Unicast Traffic" Samsung, Nov. 2005, pp. 1-5.*
Tohru Ohtsu, "Challenge to Systems Beyond IMT-2000", Approach in Wireless, ITU Journal, Mar. 2003, vol. 33, No. 3, pp. 26.
R1-060182, "3GPP TSG RAN WG1 LTE AdHoc Meeting", Jan. 23-25, 2006, Helsinki, Finland.
International Search Report w/translation from PCT/JP2007/052142 dated May 29, 2007 (5 pages).
Written Opinion from PCT/JP2007/052142 dated May 29, 2007 (3 pages).

* cited by examiner

*Primary Examiner* — Shewaye Gelagay
(74) *Attorney, Agent, or Firm* — Osha Liang LLP

(57) ABSTRACT

A base station generates a unicast channel, a MBMS channel, and a pilot channel, that are multiplied by a scrambling code specific to a particular cell. The pilot channel is replicated as necessary. The unicast channel and the MBMS channel are time-multiplexed. For data in a unit transmission frame, a same frequency component is multiplied by a same scrambling code.

8 Claims, 11 Drawing Sheets

FIG.5

| MCS NUMBER | DATA MODULATION | CHANNEL CODING RATE | RELATIVE INFORMATION RATE |
|---|---|---|---|
| MCS1 | QPSK | 1/3 | 1 |
| MCS2 | QPSK | 1/2 | 1.5 |
| MCS3 | QPSK | 2/3 | 2 |
| MCS4 | QPSK | 6/7 | 2.57 |
| MCS5 | 16QAM | 1/2 | 3 |
| MCS6 | 16QAM | 2/3 | 4 |
| MCS7 | 16QAM | 3/4 | 4.5 |
| MCS8 | 16QAM | 5/6 | 5 |
| MCS9 | 16QAM | 6/7 | 5.24 |
| MCS10 | 16QAM | 8/9 | 5.33 |

GOODNESS OF RECEPTION SIR →

TRANSMISSION APPARATUS AND TRANSMISSION METHOD

CROSS-REFERENCE TO RELATED APPLICATIONS

The present application claims priority pursuant to 35 U.S.C. §119(a) to Japanese Patent Application No. 2006-31746, filed Feb. 8, 2006, the disclosure of which is hereby incorporated by reference in its entirety.

TECHNICAL FIELD

The present invention generally relates to a technical field of radio communications. More particularly, the present invention relates to a transmission apparatus and a transmission method for transmitting a multicast broadcast channel.

BACKGROUND ART

Next generation mobile communication systems in which video communication and data communication are mainly performed require capability far higher than that for the third generation mobile communication systems (IMT-2000), so that it is necessary to sufficiently achieve large capacity, speed-up and broadband and the like. Thus, various communication environments in doors and out of doors can be considered. In data transmission in a downlink direction, not only the unicast scheme but also multicast scheme and broadcast scheme are performed. Especially, it has become increasingly valued in recent years to transmit the multimedia broadcast and multicast service (MBMS) channel. The MBMS channel may include multimedia information that is broadcasted to many specific or non-specific users, and may include various contents such as voice, characters, still images and moving images and the like (refer to non-patent document 1 as to the trend of future communication systems).

On the other hand, in broadband mobile communication systems, effects of frequency selectivity fading due to multipath environment become remarkable. Therefore, the orthogonal frequency division multiplexing scheme (OFDM) is highly expected as the next generation communication scheme. In the OFDM scheme, one symbol is formed by adding a guard interval part to an effective symbol part including information to be transmitted, and a plurality of symbols are transmitted during a predetermined transmission time interval (TTI). The guard interval part is generated using a part of information included in the effective symbol part. The guard interval part is also called cyclic prefix (CP) or an overhead.

On the other hand, the MBMS channel is different from the unicast channel in that the MBMS channel including same content is transmitted from a plurality of cells. The unicast channel is transmitted from one cell to a specific user as a general rule. The "area 1" shown in FIG. 1 includes three base stations BS1, BS2 and BS3, and a same MBMS channel is transmitted in this area. Such an area may be called a MBMS area. Similarly, "area 2" includes three base stations BS11, BS12 and BS13, and a same MBMS channel is transmitted in this area. In general, the MBMS channel transmitted in the area 1 is different from that transmitted in area 2, but, they may be the same intentionally or coincidentally. A mobile terminal (although it may be a communication terminal including a mobile terminal and a fixed terminal more generally, the mobile terminal is taken as an example for explanation for the sake of simplicity of explanation) receives MBMS channels of the same content transmitted from a plurality of cells. The received MBMS channels form many coming waves or paths according to the length of the radio propagation routes. Based on the property of the symbol of the OFDM scheme, when delay difference of the coming waves falls within the range of the guard interval, these plurality of coming waves can be combined (soft combining) without inter-symbol interference, so that reception quality can be improved because of the path diversity effect. Therefore, the guard interval length for the MBMS channel is set to be longer than the guard interval length for the unicast channel.

By the way, when a unicast channel is transmitted to a mobile terminal, each of a pilot channel, a control channel and the unicast channel is multiplied by a cell-specific scrambling code that is specific to a particular cell, and they are transmitted. The mobile terminal performs channel estimation and other processes based on the received pilot channel, performs channel compensation on the control channel and the unicast channel, and performs demodulation process after that. Since the scrambling code is different for each cell, a desired signal can be distinguished from an interference signal from other cells. However, if the unicast channel is simply replaced with the MBMS channel in this scheme (if a scrambling code that is different for each cell is used for transmission of the MBMS channel), the mobile terminal needs to distinguish signals (more particularly, pilot channels) from surrounding base stations for processing, but, it is difficult. From this viewpoint, it is proposed to prepare a scrambling code (common scrambling code) common to a plurality of cells included in a MBMS area separately for MBMS.

FIG. 2 schematically shows a manner when using the common scrambling code when transmitting the MBMS channel. In the example shown in the figure, a unicast channel is transmitted in a subframe (a unit transmission frame including a predetermined number of continuous symbols) in the first cell 1, and a MBMS channel is transmitted in another subframe. Also in the second cell 2, a unicast channel and a MBMS channel are transmitted. In this case, different scrambling codes are used between the cell 1 and the cell 2 as for the unicast channel. The scrambling code is different for each symbol. As to the MBMS channel, a same scrambling code (common scrambling code) is used in the cell 1 and cell 2. The common scrambling code is also different for each symbol.

As mentioned above, by separately preparing scrambling codes for each of the unicast channel and the MBMS channel, inter-cell interference of the MBMS channel may be directly avoided. However, if this method is adopted, different scrambling codes are applied to a pilot channel associated with the unicast channel and a pilot channel associated with the MBMS channel. Therefore, the pilot channel associated with the MBMS channel cannot be used for channel estimation on the unicast channel. Therefore, this method is not desirable from the viewpoint for achieving effective use of resources. When the unicast channel and the MBMS channel are time-multiplexed, if the duration of the MBMS channel becomes long, such inconvenience may become more and more serious.

As to this point, the technique of the non-patent document 2 proposes to use the cell-specific scrambling code also for the MBMS channel similarly to the unicast channel as shown in FIG. 3 without introducing the common scrambling code. In the technique, the scrambling code applied for the MBMS channel is common to a plurality of symbols in each subcarrier. That is, a same scrambling code is used for a same frequency component. For example, in the first cell 1, a same scrambling code A1 is applied for a pilot channel and a MBMS channel mapped to a frequency component f, and in the second cell 2, a scrambling code A2 that is different from A1 is applied for a pilot channel and a MBMS channel mapped to a frequency component f. When these are transmitted from the base station, and are received by a mobile terminal, all data (pilot channel and MBMS channel) having the frequency component f are multiplied by the same scrambling code (A1+A2). Therefore, as to the frequency component f, the mobile terminal can combine them in phase, so that the mobile terminal can combine them while performing soft combining for the MBMS channel.

[Non-patent document 1] Ootsu: "Challenge to Systems beyond IMT-200—approach from wireless—", ITU journal, Vol. 33, No. 3, pp. 26-30, March 2003

[Non-patent document 2] R1-060182, 3GPP TSG RAN WG1 AdHoc Meeting, Helsinki, Finland, 23-25 Jan., 2006

DISCLOSURE OF THE INVENTION

Problem to be Solved by the Invention

By the way, from the viewpoint for effectively using resources, the pilot channel is not mapped to all frequency components. As shown in FIGS. 2 and 3, the pilot channel is mapped only to a specific subcarrier. In the technique of the non-patent document 2, a scrambling code applied to a subcarrier $f_1$ is different from a scrambling code applied to another subcarrier $f_2$. Therefore, as to a subcarrier in which a pilot channel is not inserted, there is a problem in that channel estimation and the like cannot be performed directly.

An object of the present invention is to provide, in a communication system of the OFDM scheme in which a same frequency component of a unit transmission frame including a pilot channel and a MBMS channel is multiplied by a same scrambling code, a base station and a transmission method for improving channel estimation accuracy on a frequency component in which a pilot channel is not inserted.

Means for Solving the Problem

In the present invention, a base station used in a communication system of the OFDM scheme is used. The base station generates a unicast channel, a multicast broadcast channel, and a pilot channel, that are multiplied by a scrambling code specific to a particular cell. The pilot channel is replicated as necessary. The base station multiplexes the pilot channel, the unicast channel and the multicast broadcast channel to generate a transmission symbol, and transmits it. The unicast channel and the multicast broadcast channel are time multiplexed. A unit transmission frame including the multicast broadcast channel includes more pilot channels than those included in a unit transmission frame including the unicast channel. A same frequency component for at least the multicast broadcast channel in the unit transmission frame is multiplied by a same scrambling code.

Effect of the Invention

According to the present invention, in a communication system of the OFDM scheme in which a same frequency component for a unit transmission frame including a pilot channel and a MBMS channel is multiplied by a same scrambling code, channel estimation accuracy on a frequency component in which a pilot channel is not inserted can be improved.

BRIEF DESCRIPTION OF THE DRAWINGS

FIG. 5 is a diagram showing examples of combinations of data modulation schemes and channel coding rates;

DESCRIPTION OF REFERENCE SIGNS

Figure 1:
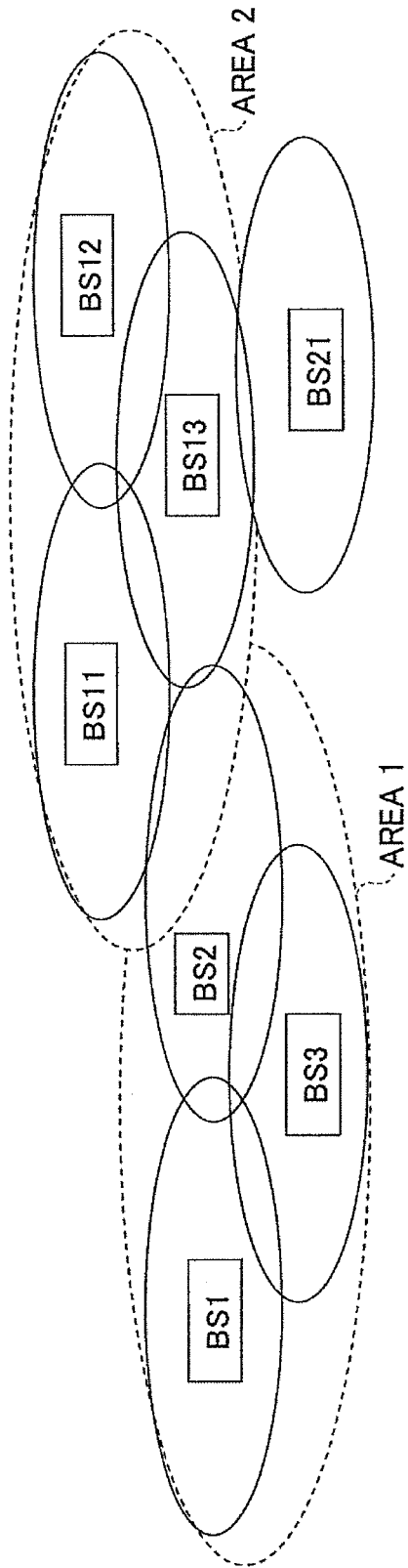
FIG. 1 is a diagram showing cells and MBMS areas.
Figure 2:
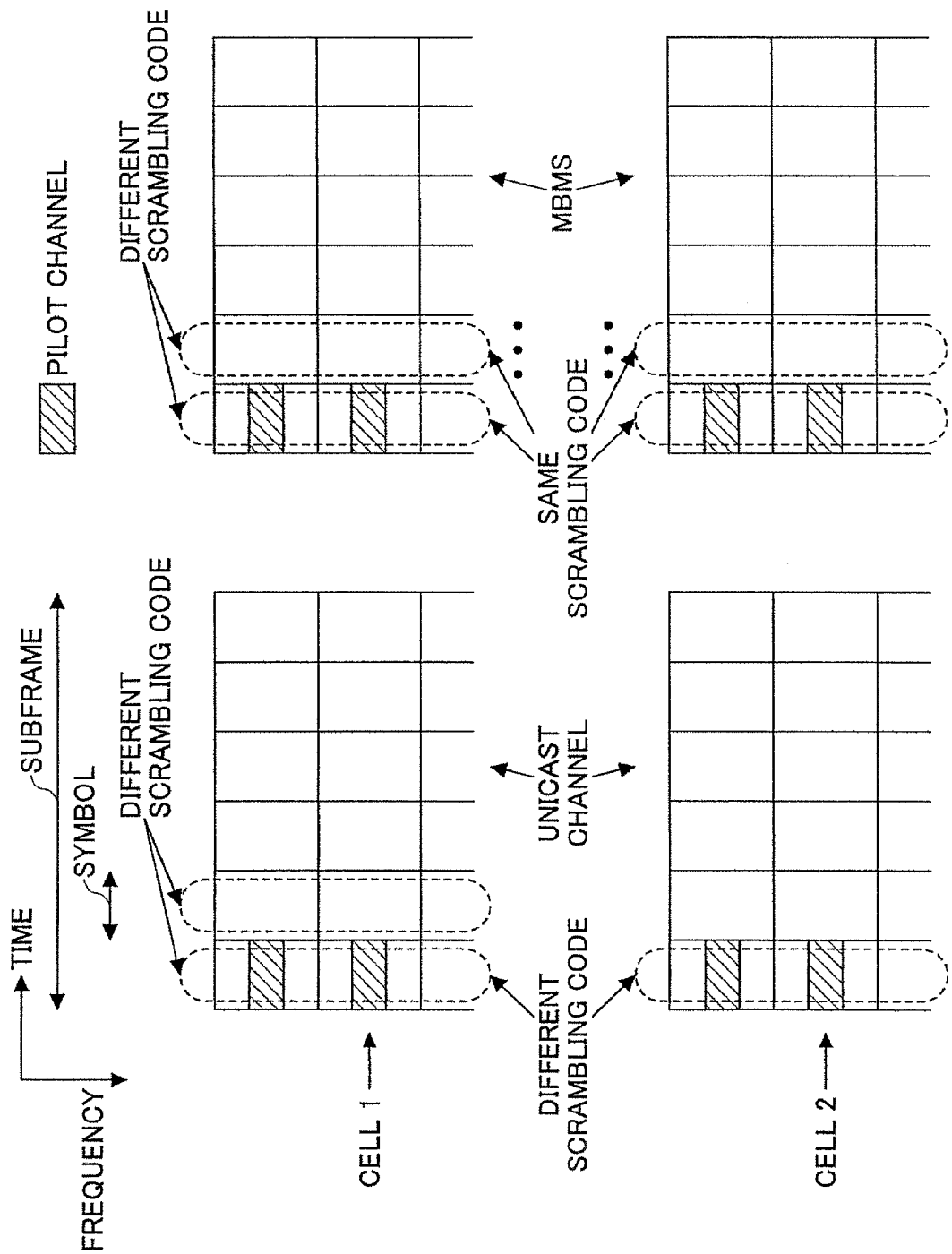
FIG. 2 is a diagram for explaining scrambling codes used for a unicast channel and a MBMS channel.

11 MBMS process unit
111 turbo encoder
112 data modulator
113 interleaver
114 scrambling code multiplying unit
12 unicast channel process unit
121 turbo encoder
122 data modulator
123 interleaver
124 scrambling code multiplying unit
19 control channel process unit
191 encoder
192 data modulator
193 interleaver
194 scrambling code multiplying unit
13 MCS setting unit
14 first multiplexing unit
15 serial parallel conversion unit (S/P)
16 second multiplexing unit (MUX)
17 inverse fast Fourier transform unit
19 digital analog conversion unit (D/A)
20 radio parameter setting unit
21, 22 scrambling code multiplying unit
23, 24 repetition unit

PREFERRED EMBODIMENTS FOR CARRYING OUT THE INVENTION

In the following, although an outline of operation and effect according to an embodiment of the present invention is given, the description is not one intended to limit the present invention, but it is merely for facilitating understanding of the present invention.

A unicast channel, a multicast broadcast channel, and a pilot channel are multiplied by a cell-specific scrambling code. A same frequency component for at least the multicast broadcast channel is multiplied by a same scrambling code.

In this embodiment, a plurality of pilot channels multiplied by a same scrambling code are prepared, and the pilot channels are mapped to different subcarriers. By interpolating the channels estimation values obtained by these pilot channels, it becomes possible to estimate a channel estimation value of a subcarrier component in which a pilot channel is not inserted, so that channel estimation accuracy can be improved. In this point, the present invention is different from the technique in the non-patent document 2 in which only one pilot channel multiplied by a scrambling code is prepared.

At least two of replicated pilot channels may be mapped to a same symbol. Accordingly, channel compensation can be performed accurately for data in a frequency position between the two pilot symbols.

According to an embodiment of the present invention, the above-mentioned scheme can be applied to a multi-antenna system. In this case, a pilot channel transmitted from a transmission antenna and a pilot channel transmitted from another transmission antenna may mapped to different subcarriers.

A unit transmission frame including a MBMS channel may be multiplied by a scrambling code common to a plurality of cells in a time axis. In addition that a same frequency is multiplied by a same scrambling code, since any common scrambling code may be used in the time direction, interference suppression effect can be increased. In addition, the common scrambling code used for multiplication in the time direction may be the same for all subcarriers in the OFDM scheme.

The transmission symbol may include a pilot channel multiplied by a scrambling code common to a plurality of cells. In this case, the pilot channel multiplied by the scrambling code common to a plurality of cells and the pilot channel (specific pilot) multiplied by the scrambling code specific to the particular cell may be mapped to different subcarriers. Although the specific pilot is normally used for demodulation of the control channel, the common pilot channel and the specific pilot are interpolated and it may be used for demodulation for the control channel in the present embodiment.

The pilot channel multiplied by the scrambling code common to a plurality of cells and the pilot channel multiplied by the scrambling code specific to the particular cell may be mapped to different times. Accordingly, the initial part of the radio frame becomes common to the unicast and the MBMS channel, so that the signal processing method can be unified as much as possible.

Embodiment 1

In the following embodiment, although a system that adopts the orthogonal frequency division multiplexing (OFDM) scheme in the downlink is described, the present invention may be adopted for systems of other multicarrier schemes.

Figure 4:
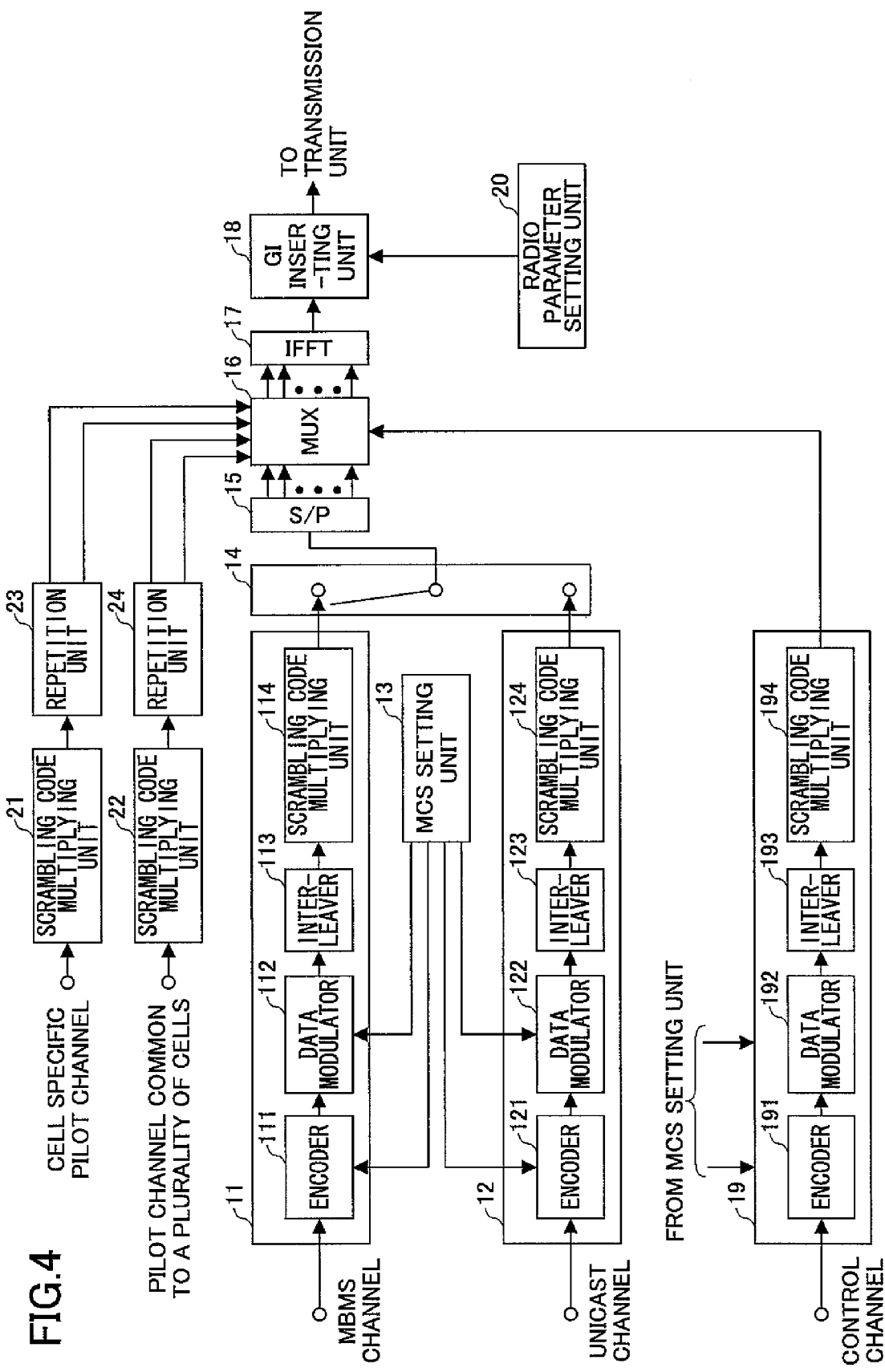
FIG. 4 shows a schematic block diagram of a transmitter according to an embodiment of the present invention.

FIG. 4 shows a schematic block diagram of a transmitter according to an embodiment of the present invention. Although this transmitter is typically provided in a base station as the present embodiment, it may be provided in other apparatus. The base station includes a MBMS process unit 11, a unicast channel process unit 12, a MCS setting unit 13, a control channel process unit 19, a first multiplexing unit 14, a serial to parallel conversion unit (S/P) 15, a second multiplexing unit (MUX) 16, a fast Fourier transform unit (IFFT) 17, a guard interval inserting unit 18, a radio parameter setting unit 20, scrambling code multiplying units 21 and 22, and repetition units 23 and 24. The MEMS process unit 11 includes an encoder 111, a data modulator 112, an interleaver 113, and a scrambling code multiplying unit 114. The unicast channel process unit 12 includes an encoder 121, a data modulator 122, an interleaver 123, and a scrambling code multiplying unit 124. The control channel process unit 19 includes an encoder 191, a data modulation unit 192, an interleaver 193 and a scrambling code multiplying unit 194.

The MBMS process unit 11 performs processes on a multicast broadcast multimedia service (MBMS) channel. The MBMS channel includes multimedia information that is broadcasted to many specific or non-specific users, and may include various contents such as voice, characters, still images and moving images and the like.

The encoder 111 performs channel coding for enhancing channel error tolerance. Coding may be performed by various methods such as convolution coding, turbo coding and the like that are known in this technical field. The channel coding rate may be fixed or may be changed according to an instruction from the MCS setting unit 13.

The data modulator 112 performs data modulation on the MBMS channel using a proper modulation scheme such as QPSK, 16QAM, 16QAM and the like. The modulation scheme may be fixed or may be changed according to an instruction from the MCS setting unit 13.

The interleaver 13 permutes the arranging order of data included in the MBMS channel according to a predetermined pattern.

The scrambling code multiplying unit 114 multiplies data by a scrambling code. In the present embodiment, the scrambling code is a scrambling code different for each cell, and is the same as the scrambling code used for the unicast channel.

The unicast channel process unit 12 performs processes on a channel addressed to a specific user (1 user, typically).

The encoder 121 performs coding for enhancing error tolerance of the unicast channel. Coding may be performed by various methods such as convolution coding, turbo coding and the like that are known in this technical field. In the present embodiment, adaptive modulation and coding (AMC) is performed for the unicast channel, and the channel coding rate is adaptively changed according to an instruction from the MCS setting unit 13.

The data modulator 122 performs data modulation for the unicast channel by a proper modulation scheme such as QPSK, 16QAM, 64QAM and the like. In the present embodiment, adaptive modulation and coding (AMC) is performed for the unicast channel, and the modulation scheme is adaptively changed according to an instruction from the MCS setting unit 13.

The interleaver 123 permutes the arranging order of data included in the unicast channel according to a predetermined pattern.

The scrambling code multiplying unit 114 multiplies data by a scrambling code that is different for each cell.

The control channel process unit 19 performs processes on a control channel addressed to a specific user (1 user, typically).

The encoder 191 performs coding for enhancing error tolerance of the control channel. Coding may be performed by various methods such as convolution coding, turbo coding and the like that are known in this technical field.

The data modulator 192 performs data modulation for the control channel by a proper modulation scheme such as QPSK, 16QAM, 64QAM and the like. However, requirement for speeding up the control channel is low, and requirement for reliability is strong, thus, AMC control is not performed in the present embodiment.

The interleaver 193 permutes the arranging order of data included in the control channel according to a predetermined pattern.

The scrambling code multiplying unit 194 multiplies data by a scrambling code that is different for each cell.

The MCS setting unit 13 provides instructions to each process element so as to change as necessary a combination of a modulation scheme and a coding rate used for the MBMS channel and a combination of a modulation scheme and a coding rate used for the unicast channel. The combination of the modulation scheme and the coding rate is specified by a number (MCS number) indicating combination content.

FIG. 5 shows examples of combinations of data modulation schemes and channel coding rates. In the example shown in the figure, relative information rates are shown, and the MCS numbers are assigned in an ascending order of information rate. AMC control is intended to achieve required quality in the reception side by adaptively changing one or both of the modulation scheme and the coding scheme according to the quality of channel state. The quality of the channel state may be evaluated by reception quality (reception SIR and the like) of a downlink pilot channel. By performing AMC control, required quality can be achieved by increasing reliability for a user of bad channel state, and throughput can be improved while maintaining required quality for a user of good channel state.

The first multiplexing unit 14 shown in FIG. 4 time-multiplexes the MBMS channel and the unicast channel in a same frequency band.

The serial to parallel conversion unit (S/P) 15 converts a serial signal sequence (stream) into parallel signal sequences. The number of the parallel signal sequences may be determined according to the number of subcarriers.

The second multiplexing unit (MUX) 16 multiplexes a plurality of data sequences representing the output signal from the first multiplexing unit 14 and the pilot channel and/or a broadcast channel. The multiplexing may be performed by any scheme of time-multiplexing, frequency-multiplexing, or time and frequency multiplexing.

The inverse fast Fourier transform unit 17 performs inverse fast Fourier transform on a signal input to it to perform modulation in the OFDM scheme.

The guard interval inserting unit 18 adds a guard interval (part) to a symbol after being modulated based on the OFDM scheme to generate a transmission symbol. As is known well, the guard interval is generated by replicating a series of data including head data of the symbol to be transmitted, and the transmission symbol is generated by adding the guard interval to the end. Alternatively, the guard interval is generated by replicating a series of data including end data of the symbol to be transmitted, and the transmission symbol is generated by adding the guard interval to the head.

The radio parameter setting unit 20 sets a radio parameter used for communication. The radio parameter (group) includes information for defining the format of the symbol of the OFDM scheme, and may include a group of information specifying a duration $T_{GI}$ of the guard interval part, a duration of an effective symbol part, a ratio occupied by the guard interval in one symbol, and a subcarrier duration $\Delta f$ and the like. By the way, the duration of the effective symbol part is the same as a reciprocal $1/\Delta f$ of the subcarrier duration.

The radio parameter setting unit 20 sets a proper radio parameter group according to a communication status or an instruction from other apparatus. For example, the radio parameter setting unit 20 chooses the radio parameter group to be used according to whether a transmission subject is a unicast channel or a MBMS channel. For example, a radio parameter group defining a shorter guard interval part may be used for the unicast channel, and a radio parameter group defining a longer guard interval part may be used for the MBMS channel. The radio parameter setting unit 20 may calculate and derive the proper radio parameter group as occasion demands, or a plurality of groups of radio parameters may be stored in a memory beforehand so that one group may be selected as necessary.

The scrambling code multiplying unit 21 multiplies a pilot channel that is supplied to the unit 21 by a scrambling code. The scrambling code is the cell-specific scrambling code (specific scrambling code) prepared such that it is different for each cell.

The scrambling code multiplying unit 22 also multiplies a pilot channel that is supplied to the unit 22 by a scrambling code. The scrambling code is a scrambling code (common scrambling code) commonly prepared for a plurality of cells. The pilot channels supplied to the scrambling code multiplying units 21 and 22 may be the same or may be different.

The repetition unit 23 replicates data input to the unit 23 and outputs it. The number of replications may be changed as necessary, but, the number of replications is 2 in the present embodiment.

The repetition unit 24 also replicates the data input to the unit 24 and outputs it. The number of replications may be changed as necessary, but, the number of replications is 2 in the present embodiment.

Figure 6:
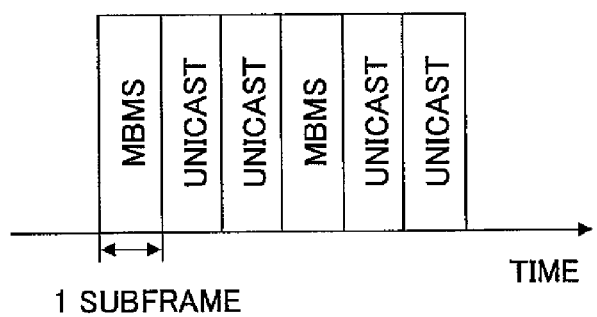
FIG. 6 is a diagram showing a manner in which the unicast channel and the MBMS channel are time multiplexed.

Each of the MBMS channel supplied to the MBMS process unit of FIG. 4 and the unicast channel supplied to the unicast channel process unit is channel-coded and data modulated using a proper coding rate and modulation scheme specified by its MCS number, and they are time-multiplexed after interleaving. Time-multiplexing may be performed in various time units. For example, it may be performed in units of the radio frame, or may be performed in units of the subframe forming the radio frame. FIG. 6 shows an example in which time multiplexing is performed in units of subframe. As an example, the subframe may be equal to the transmission time interval (TTI) that is 0.5 ms, for example. Alternatively, instead of the units of subframe, time multiplexing may be performed in units of radio frame such as 10 ms, for example. The examples of the numbers are merely examples, and time multiplexing may be performed in units f various durations. By the way, the names of "subframe" and "radio frame" are merely for the sake of convenience, and they are merely an amount representing a time unit.

The channel after time-multiplexing is multiplexed with the pilot channel, and after that, inverse fast Fourier transform is performed on the channel so as to perform modulation of the OFDM scheme. The guard interval is added to the symbol after modulation, a base band OFDM symbol is output, it is converted to an analog signal, and the signal is transmitted by radio via the transmission antenna.

Figure 7:
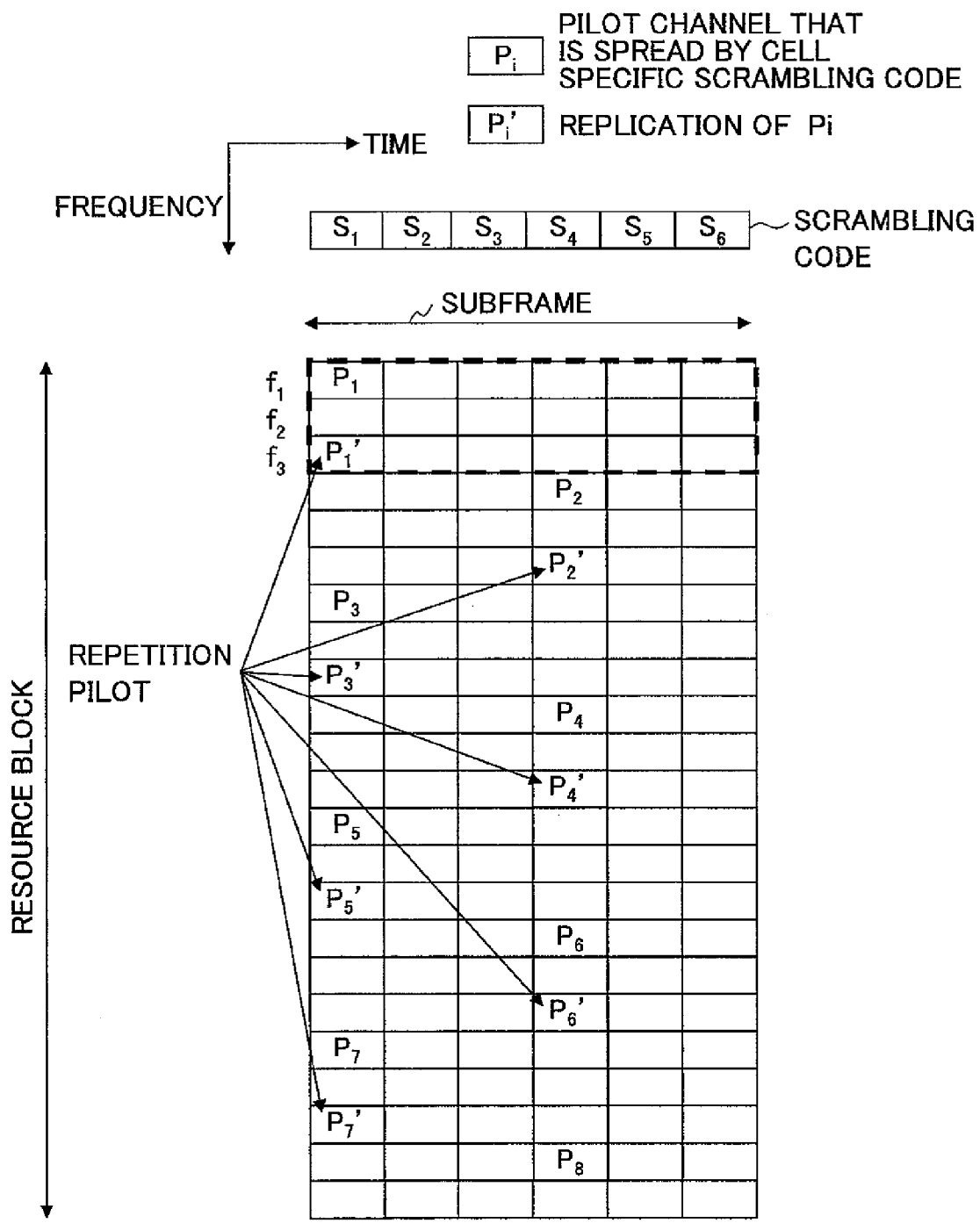
FIG. 7 is a diagram showing an example for inserting pilot channels according to an embodiment of the present invention.
Figure 8:
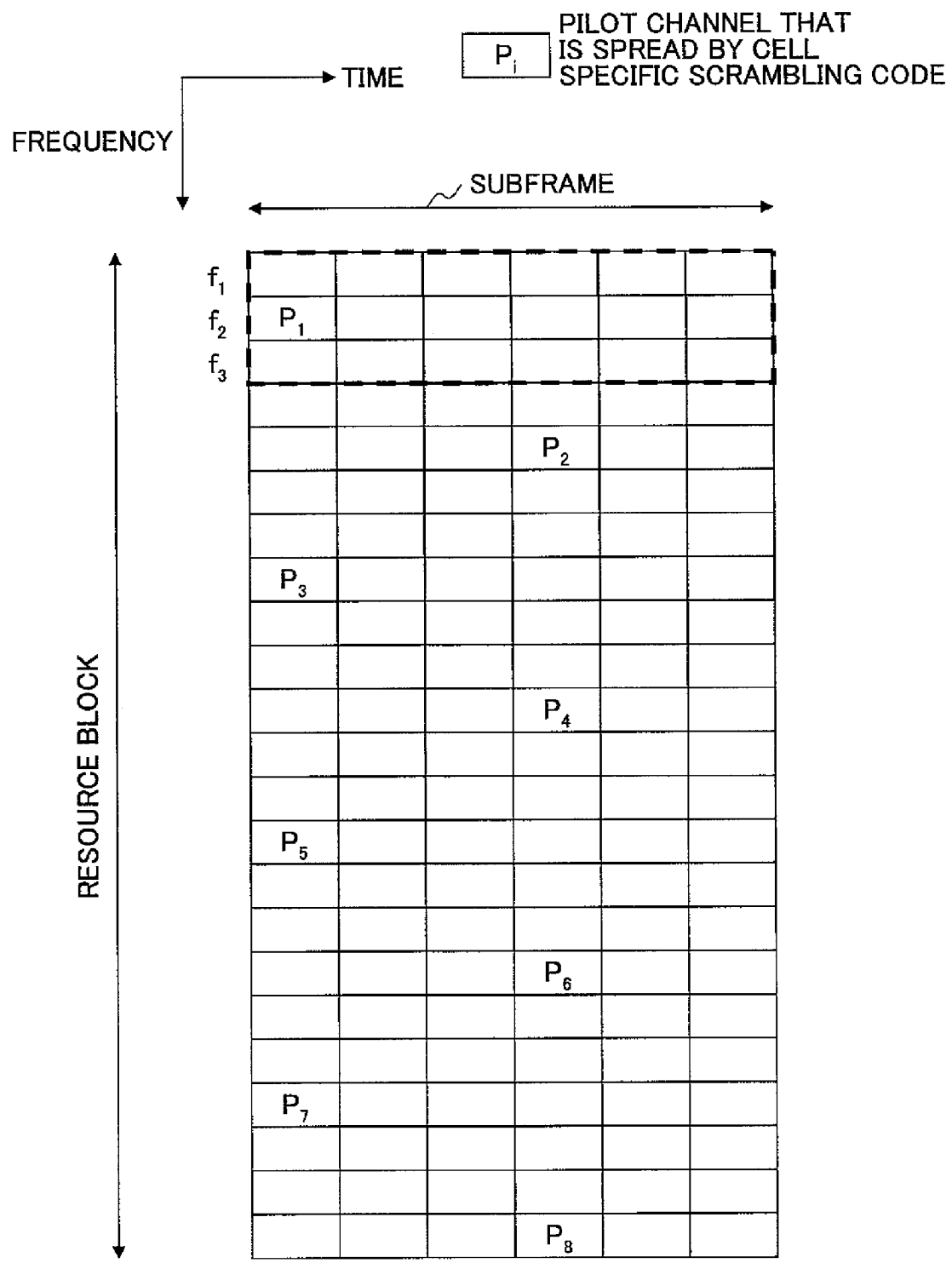
FIG. 8 is a diagram showing an example for inserting pilot channels according to a conventional example.

FIG. 7 is a diagram showing inserting positions of the pilot channel according to an embodiment of the present invention. Therefore, such radio frame is transmitted from a base station to a mobile station. For comparison, inserting positions of the pilot channel used in the non-patent document 2 are shown in FIG. 8. In both of the figures, a part enclosed by a broken line frame indicates a region to which a same scrambling code is applied. Same discussions can be applied also for other parts, only one broken line frame is shown for simplifying the drawing. For the sake of description, although one resource block or chunk is configured in the whole frequency region shown in the figure, this assumption is not essential. In the conventional configuration shown in FIG. 8, only one pilot channel is included in one broken line frame. Thus, for the whole of data (MBMS channel and control channel) included in the broken line frame, only channel estimation result by one pilot channel can be used. More particularly, a channel estimation value is derived using a pilot channel inserted in the subcarrier $f_2$, so that channel compensation for all of the subcarriers $f_1, f_2, f_3$ is performed using the channel estimation value. As mentioned above, since proper channel estimation cannot be performed for subcarriers in which the pilot channel is not inserted, it can be predicted that channel compensation for data including frequency components of subcarriers $f_1, f_3$ is not sufficient.

On the other hand, according to the present embodiment, two pilot channels are inserted in the broken line frame. These are same content, and are obtained by being repeated in the repetition unit 23 of FIG. 4, and mapped to the first symbol of the unit transmission frame in the multiplexing unit 16. For the sake of convenience, the pilot channel repeated in the repetition unit is called a repetition pilot channel. Assuming that cell-specific scrambling codes used for subcarriers $f_1$ and $f_2$ are $A_1$ and $A_2$. In this case, as to the component of the subcarrier $f_1$, the same scrambling code $A_1$ is used for the pilot channel and a following MBMS channel. As to the component of the subcarrier $f_2$, the scrambling code $A_2$ is used. In the present embodiment, content the same as one of the (spread) pilot channel of the subcarrier $f_1$ is inserted into the first symbol of the subcarrier $f_3$. Therefore, the system is configured such that, for the component of the subcarrier $f_3$, the scrambling code $A_1$ is used for the pilot channel, and a scrambling code $A_3$ that is different from that is used for the following MBMS channel. This point is different from the example shown in FIG. 8 in which the same scrambling code $A_3$ is used for all of the first symbol of the subcarrier $f_3$ and after that. Assuming that the inserting position of the pilot channel is the same also in other cells. That is, assuming that, in the cell 1 and in the cell 2, pilot channels and the replicated data are used based on a pattern the same as the inserting pattern shown in the figure.

In the cell 2, it is assumed that cell-specific scrambling codes used for subcarriers $f_1$ and $f_2$ are $B_1$ and $B_2$. In this case, as to the component of the subcarrier $f_1$, the same scrambling code $B_1$ is used for the pilot channel and a following MBMS channel. As to the component of the subcarrier $f_2$, the scrambling code $B_2$ is used. Content the same as one of the (spread) pilot channel of the subcarrier $f_1$ is inserted into the first symbol of the subcarrier $f_3$. Therefore, the system is configured such that, for the component of the subcarrier $f_3$, the scrambling code $B_1$ is used for the pilot channel, and the scrambling code $B_3$ that is different from that is used for the following MBMS channel.

Assuming that such transmission symbols are transmitted from the cell 1 and the cell 2 respectively, and they are received by a mobile terminal simultaneously. In the received signal, as to the subcarrier $f_1$, the pilot channel and the MEMS channel are equally multiplied by scrambling code (A1+B1), so that the MBMS channel can be combined in phase. As to the subcarrier $f_3$, the pilot channel is multiplied by scrambling code (A1+B1), and the MBMS channel is multiplied by scrambling code (A3+B3). Therefore, also as to the subcarrier $f_3$, the MBMS channel can be combined in phase. In addition, the subcarriers $f_1$ and $f_3$ are multiplied by the same scrambling code (A1+B1). Therefore, by using the pilot channels of the subcarriers $f_1$ and $f_3$, channel estimation value of other subcarrier $f_2$ can be interpolated. Thus, according to the present embodiment, a channel estimation value for subcarrier in which the pilot channel is not inserted can be accurately obtained by interpolation while combining the MBMS channel in phase. The inserting positions of a plurality of spread pilot channels are not limited to positions of different subcarriers in a same symbol. Symbols to which they are inserted may be different. In any case, it is only necessary that the pilot channel is inserted in a same inserting position in all cells and that a same scrambling code is used for a same frequency component of the MBMS channel.

Embodiment 2

Figure 9:
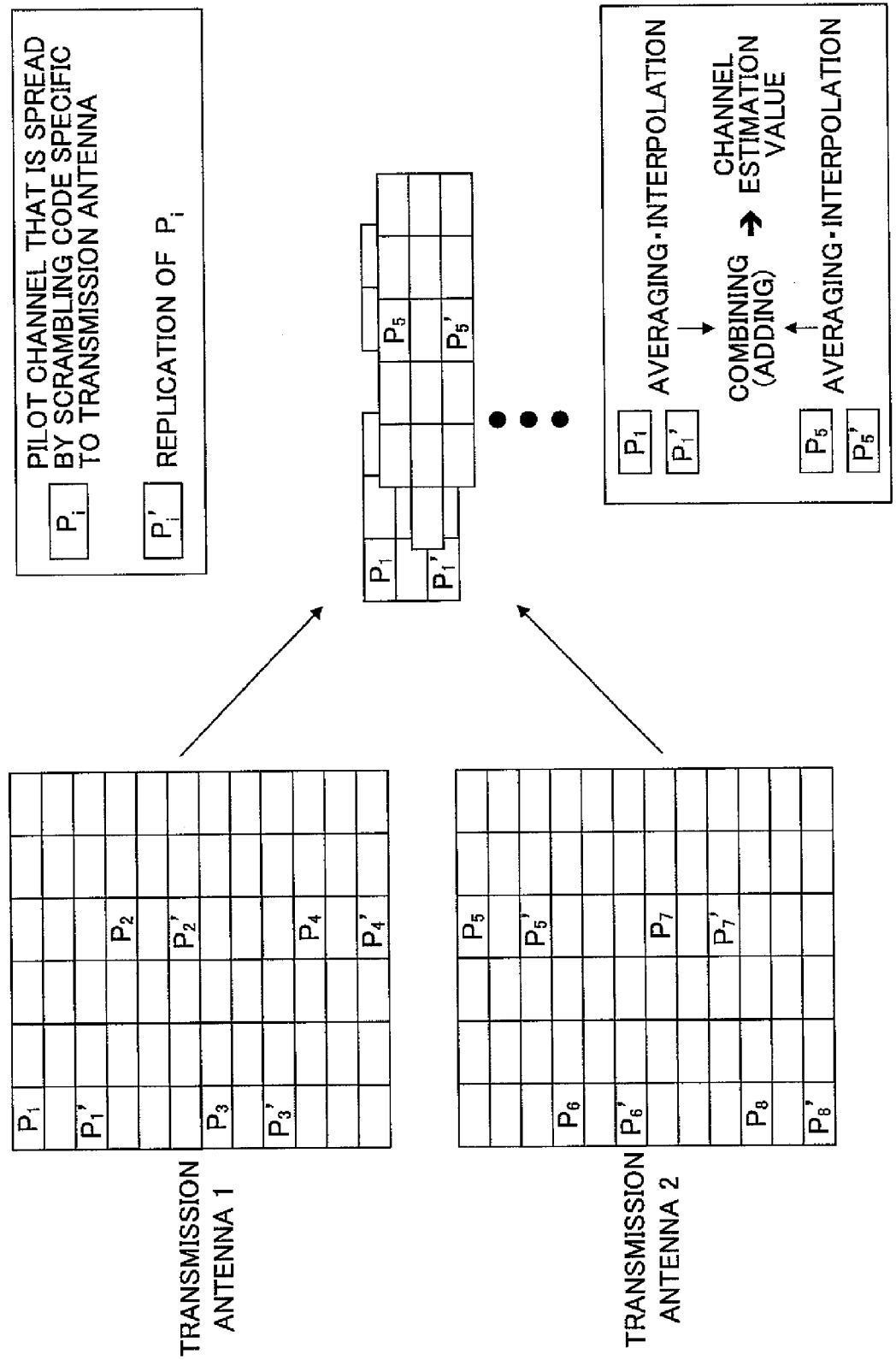
FIG. 9 is a diagram showing an example for inserting pilot channels in an multi-antenna system.

FIG. 9 is a figure showing positions for inserting pilot channels according to an embodiment of the present invention. In the present embodiment, the base station is provided with a plurality of transmission antennas, and multi-antenna system, MIMO (Multiple Input Multiple Output) multiplexing scheme, or MIMO diversity scheme is used. In the example shown in the figure, the base station is provided with two transmission antennas, and a different scrambling code is used for a signal transmitted by each transmission antenna. A point that a same scrambling code is used for a same frequency component, and a point that different scrambling codes are used for signals transmitted over different transmission routes and the like are similar to the case of the first embodiment. However, in the present embodiment, a pilot channel transmitted from a transmission antenna 1 and a pilot channel transmitted from a different transmission antenna 2 are mapped to different subcarrier. Accordingly, the mobile station can perform interpolation not only in the frequency direction but also in the time direction, so that more accurate channel estimation can be performed.

Embodiment 3

Figure 3:
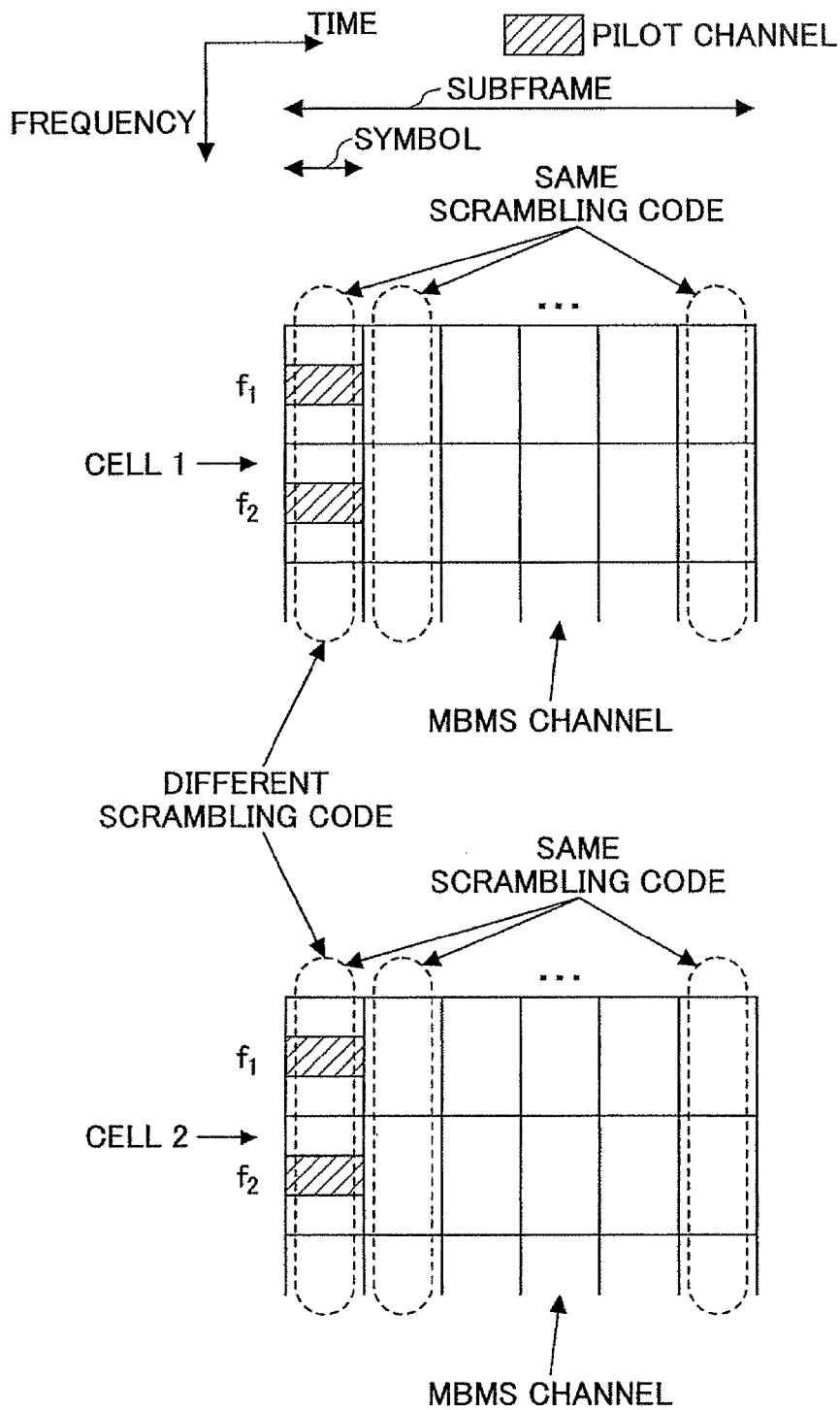
FIG. 3 is a diagram for explaining scrambling codes used for a unicast channel and a MBMS channel.

As mentioned above, as to a same frequency component, a same scrambling code is used for multiplication. However, it should be noted that it is not prohibited that the scrambling code is used for multiplication in the time direction. For example, assuming a radio frame (or subframe) that includes six symbols in the time direction as shown in FIG. 3. Assuming that, in the cell 1, all data having a frequency component f is multiplied by a same scrambling code A, and that, in the cell 2, all data having the frequency component f is multiplied by a same scrambling code B. Then, it is assumed that a subframe in each of the cell 1 and the cell 2 is multiplied by scrambling codes represented by (S1, S2, . . . , S6) in the time direction. In this case, since the mobile station receives six symbols of $S_1(A+B), S_2(A+B), \ldots, S_6(A+B)=(S_1, S_2, \ldots, S_6)(A+B)$ as to the frequency component f, the mobile station can still perform combining in phase. As long as same scrambling code is used for multiplication in both of the cells 1 and 2, this property is maintained. As mentioned above, not only the same scrambling code (cell-specific scrambling code) can be used in the frequency direction, but also any scrambling code common to a plurality of cells can be used, so that interference suppression effect can be further strengthened. In addition, the scrambling code used for multiplication in the time direction may be configured to be the same for all subcarriers in the OFDM scheme.

Embodiment 4

Figure 10:
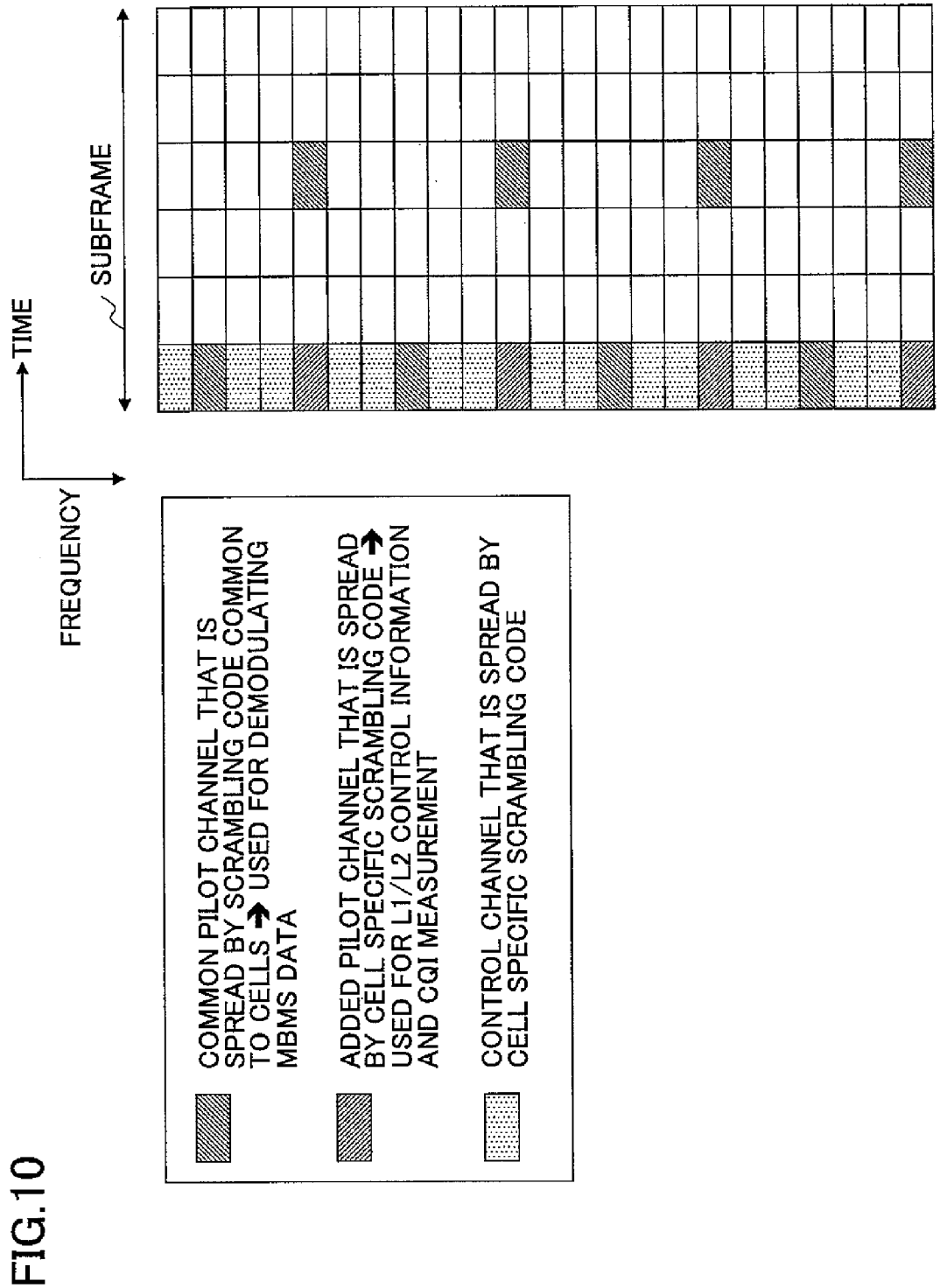
FIG. 10 is a diagram showing an example for inserting pilot channels according to an embodiment of the present invention.

FIG. 10 shows an example of inserting pilot channels according to an embodiment of the present invention. In the example shown in the figure, in general, a control channel and a MBMS channel that are spread by a cell-specific scrambling code are time division multiplexed. The control channel and the pilot channel are frequency-division multiplexed. The pilot channel includes a pilot channel (common pilot channel) that is spread by a scrambling code common to a plurality of cells and a pilot channel (specific pilot channel) that is spread by a scrambling code specific to the cell. The common pilot channel is used for channel estimation and demodulation for the MBMS channel. The specific pilot channel is used for channel estimation and demodulation for the control channel, or may be used for CQI measurement. As shown in the figure, the common pilot channel is mapped so as to be distributed over the whole of the subframe as much as possible. Then, the common pilot channel and the specific pilot channel are alternately mapped on the frequency axis. By placing the common or specific pilot channel, not only the specific pilot channel but also the common pilot channel can be used for channel compensation and the like for the control channel (more particularly, interpolation for them can be performed), so that demodulation accuracy of the control channel can be improved.

Figure 11:
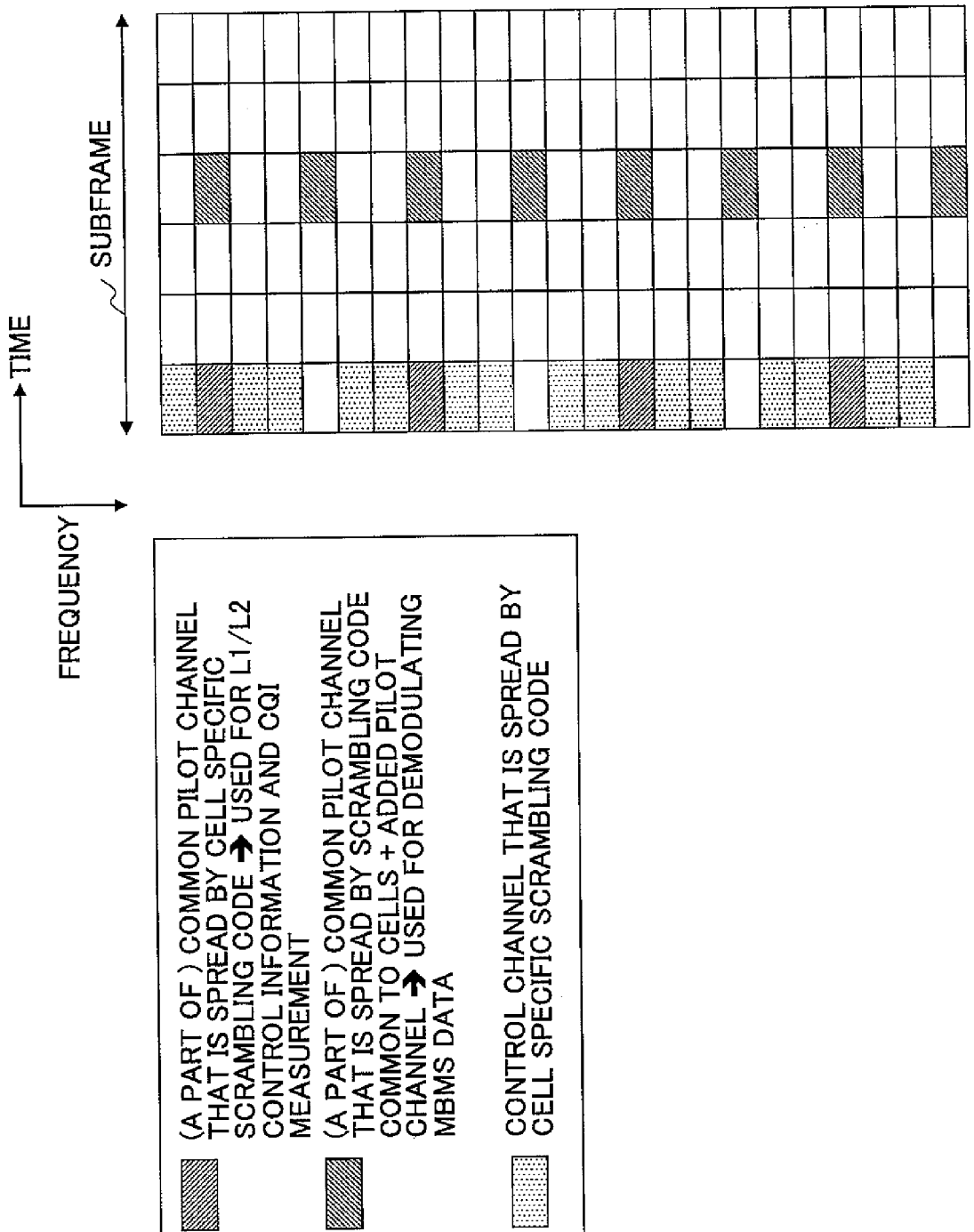
FIG. 11 is a diagram showing an example for inserting pilot channels according to an embodiment of the present invention.

FIG. 11 is a figure showing an example of inserting pilot channels according to an embodiment of the present invention. Meanings indicated by the symbols or patterns in the figure are the same as those in FIG. 10. In FIG. 11, the common pilot channel and the specific pilot channel are mapped in different times. In this case, the configuration of the subframe at the first symbol becomes the same between the MBMS channel and the unicast channel. Therefore, this method is preferable from the viewpoint of unifying signal processing methods for both of the channels as much as possible.

The invention claimed is:

1. A base station used in a communication system of an orthogonal frequency division multiplexing (OFDM) scheme, comprising:
    a unit configured to generate a unicast channel multiplied by a scrambling code specific to a particular cell;
    a unit configured to generate a multicast broadcast channel multiplied by a scrambling code specific to the particular cell;
    a unit configured to generate and replicate a pilot channel multiplied by a scrambling code specific to the particular cell;
    a unit configured to multiplex the pilot channel, the unicast channel and the multicast broadcast channel to generate transmission symbols; and
    a unit configured to transmit the transmission symbols for each unit transmission frame that includes a plurality of symbols each having a predetermined duration, wherein
    a unit transmission frame including the unicast channel and a unit transmission frame including the multicast broadcast channel are time multiplexed, and
    a same frequency component for at least the multicast broadcast channel in the unit transmission frame is multiplied by a same scrambling code, and
    a symbol in which the pilot channel and a replica of the pilot channel are mapped and another symbol including the multicast broadcast channel are time multiplexed in the unit transmission frame.

2. The base station as claimed in claim 1, wherein
    a plurality of transmission antennas are provided,
    a transmission symbol in which the pilot channel, the unicast channel and the multicast broadcast channel are multiplexed is transmitted from each transmission antenna, and
    a pilot channel transmitted from a transmission antenna and a pilot channel transmitted from another transmission antenna are mapped to different subcarriers.

3. The base station as claimed in claim 1, wherein a unit transmission frame including the multicast broadcast channel is multiplied by a scrambling code common to a plurality of cells in the time axis.

4. The base station as claimed in claim 3, wherein the scrambling code common to a plurality of cells is the same for all subcarriers in the OFDM scheme.

5. The base station as claimed in claim 1, wherein the transmission symbol includes a pilot channel multiplied by a scrambling code common to a plurality of cells.

6. The base station as claimed in claim 5, wherein the pilot channel multiplied by the scrambling code common to a plurality of cells and the pilot channel multiplied by the scrambling code specific to the particular cell are mapped to different subcarrier frequencies.

7. The base station as claimed in claim 5, wherein the pilot channel multiplied by the scrambling code common to a plurality of cells and the pilot channel multiplied by the scrambling code specific to the particular cell are mapped to different times.

8. A transmission method used in a communication system of an orthogonal frequency division multiplexing (OFDM) scheme, comprising:
    generating a unicast channel, a multicast broadcast channel, and a pilot channel, that are multiplied by a scrambling code specific to a particular cell;
    replicating the generated pilot channel;
    multiplexing the pilot channel, the unicast channel and the multicast broadcast channel to generate transmission symbols; and
    transmitting the transmission symbols for each unit transmission frame that includes a plurality of symbols each having a predetermined duration, wherein
    a unit transmission frame including the unicast channel and a unit transmission frame including the multicast broadcast channel are time multiplexed,
    a same frequency component for at least the multicast broadcast channel in the unit transmission frame is multiplied by a same scrambling code, and
    a symbol in which the pilot channel and a replica of the pilot channel are mapped and another symbol including the multicast broadcast channel are time multiplexed in the unit transmission frame.

* * * * *